United States Patent [19]
Dybro et al.

[11] Patent Number: 5,820,056
[45] Date of Patent: Oct. 13, 1998

[54] RETRACTOR WITH LOAD LIMITING SPOOL

[75] Inventors: Niels Dybro, Utica, Mich.; Harjeet Gill, Windsor, Canada

[73] Assignee: AlliedSignal Inc., Morristown, N.J.

[21] Appl. No.: 795,113

[22] Filed: Feb. 6, 1997

[51] Int. Cl.⁶ .......................... B60R 22/28; B60R 22/46
[52] U.S. Cl. .................. 242/374; 242/379.1; 280/805
[58] Field of Search ............... 242/374, 379.1; 280/805, 806; 297/470, 471, 472

[56] References Cited

U.S. PATENT DOCUMENTS

| | | | |
|---|---|---|---|
| 3,857,528 | 12/1974 | Fiala | 242/379.1 |
| 5,526,996 | 6/1996 | Ebner et al. | 242/379.1 |
| 5,626,306 | 5/1997 | Miller et al. | 242/379.1 |
| 5,671,894 | 9/1997 | Dybro et al. | 242/379.1 |

*Primary Examiner*—John M. Jillions
*Attorney, Agent, or Firm*—Markell Seitzman

[57] ABSTRACT

An energy absorbing seat belt retractor comprises a frame, a spool rotatably mounted relative to the frame for protracting and retracting a seat belt wound thereabout, and a driving member (e.g., a rotatable and slidable nut) operatively coupled to the spool. A deformable energy absorbing member is disposed within a bore of the spool and functions to receive a driving force supplied by the driving member responsive to an occupant load, and to deform when the driving force exceeds a predetermined threshold to thereby absorb energy and permit a controlled rotation of the spool and a corresponding controlled protraction of the belt as the belt is loaded by the occupant. At least one stop ring is disposed in proximity to the deformable member and functions to contact the deformable member in a deformed state and control further deformation thereof to thereby limit the protraction of the seat belt.

29 Claims, 5 Drawing Sheets

RETRACTOR WITH LOAD LIMITING SPOOL

BACKGROUND AND SUMMARY OF THE INVENTION

The present invention generally relates to seat belt retractors and more particularly, to a retractor having an energy absorbing means for limiting the loads imparted to the seat belt to thereby control the forward motion of the occupant during an accident.

Many conventional seat belt retractors operate during an accident by employing a locking mechanism to prevent rotation of a spool to which the seat belt is attached, thus preventing protraction of the seat belt. This action locks the automobile occupant in place. Designers have developed seat belt retractors which limit the loads on the seat belt during an accident by allowing the seat belt to controllably protract. These retractors, sometimes called "constant force" retractors, typically incorporate an energy absorbing mechanism, the purpose of which is to generate a reaction force or torque which opposes and controls or limits the loads on the seat belt as the belt is loaded by the occupant during an accident. This controlled reaction force limits the occupant's forward motion during the accident and in so doing limits the head injury criteria (HIC) and chest loads or acceleration.

The above-noted constant force retractors have also been designed to operate in conjunction with pretensioners (also called belt tighteners). Pretensioners function to reverse wind the retractor spool at the onset of an accident to eliminate slack in the lap and/or shoulder belt. A typical pretensioner for a seat belt retractor comprises a movable piston joined to a clutch via a cable. Clutch jaws or rollers are moved into engagement with a part of the retractor spool or shaft to reverse rotate the spool as the cable is pulled outwardly. The operation of this combination of components is generally known.

Figure 1:
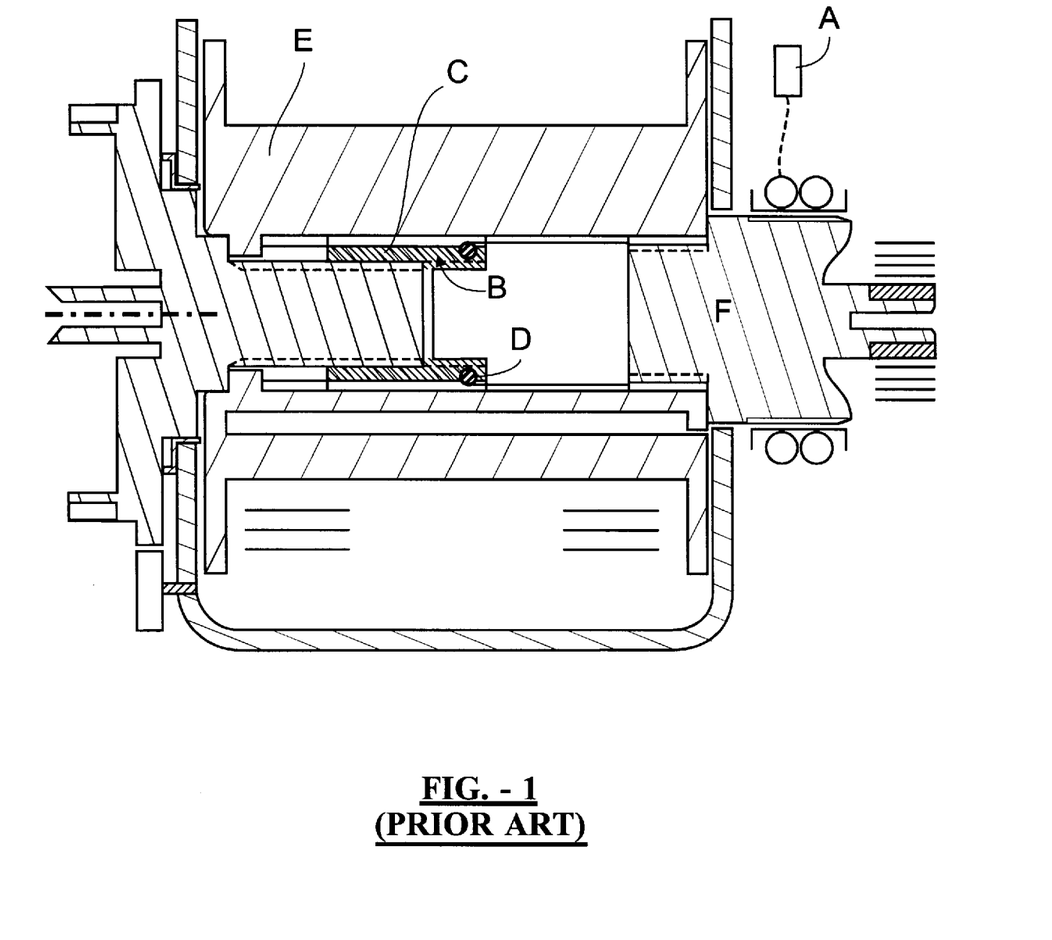
FIG. 1 shows a prior art seat belt retractor.

FIG. 1 shows a prior art seat belt retractor that incorporates both of the above features, that is, a pretensioner A and a load limiter B. The load limiter comprises a movable nut C having a set of hardened balls D that deform a portion of a spool E as the nut and balls move. As the balls deform the spool, a generally constant reaction force is provided, thus permitting a controlled rotation of the spool. However, the incorporation of a pretensioner with a retractor having a load limiting function can reduce the effectiveness of the load limiter. This limitation arises from the following: at the inception of an accident the pretensioner in cooperation with a clutch, reverse winds the retractor spool to eliminate slack in the belt. Subsequently, the load limiting device permits the spool to rotate in an opposite, belt unwinding direction permitting the controlled protraction of the seat belt. If the pretensioner remains coupled to the spool, by for example the continued engagement of the clutch rollers or jaws, then the amount of permitted protraction under control of the load limiter is limited by the pretensioner stroke, i.e., to the amount of webbing rewound during operation of the pretensioner. The above limitation arises principally because the pretensioner, via an axle art F, directly drives the spool E.

Accordingly, a need exists for a constant force retractor operable with a pretensioner wherein the amount of permitted protraction by the load limiter is independent of the pretensioner stroke.

There is also a need for a constant force retractor which has improved control of the energy absorbing mechanism such that a tight tolerance of the load-limiting force provided by the retractor can be obtained. Moreover, there is a need for a constant force retractor that is capable of limiting the belt protraction distance once the energy absorbing mechanism is extinguished.

The present disclosure is directed to an energy absorbing seat belt retractor which comprises: a frame, a spool rotatably mounted relative to the frame for protracting and retracting a seat belt wound thereabout, and a driving member (e.g., a rotatable and slidable nut) operatively coupled to the spool. A deformable energy absorbing member (e.g., a leaded steel bushing) is disposed within a bore of the spool and functions to receive a driving force supplied by the driving member responsive to an occupant load, and to deform when the driving force exceeds a predetermined threshold to thereby absorb energy and permit a controlled rotation of the spool and a corresponding controlled protraction of the belt as the belt is loaded by the occupant. At least one stop ring is disposed in proximity to the deformable member and functions to contact the deformable member in a deformed state and control further deformation thereof to thereby limit the protraction of the seat belt.

Preferably, at least a portion of the inner diameter of the stop ring is tapered to substantially conform to a buckled deformation shape of the deformable member to prevent the excessive deformation. In addition, the retractor can be used in combination with a pretensioner that is decoupled from the spool such that the controlled protraction is independent of the pretensioner stroke.

Many other objects and purposes of the invention will be clear from the following detailed description of the drawings.

BRIEF DESCRIPTION OF THE DRAWINGS

For a better understanding of the present invention, reference is had to exemplary embodiments thereof, considered in conjunction with the accompanying drawings in which like reference numerals designate similar or identical elements, wherein.

DETAILED DESCRIPTION OF THE DRAWINGS

Figure 2:
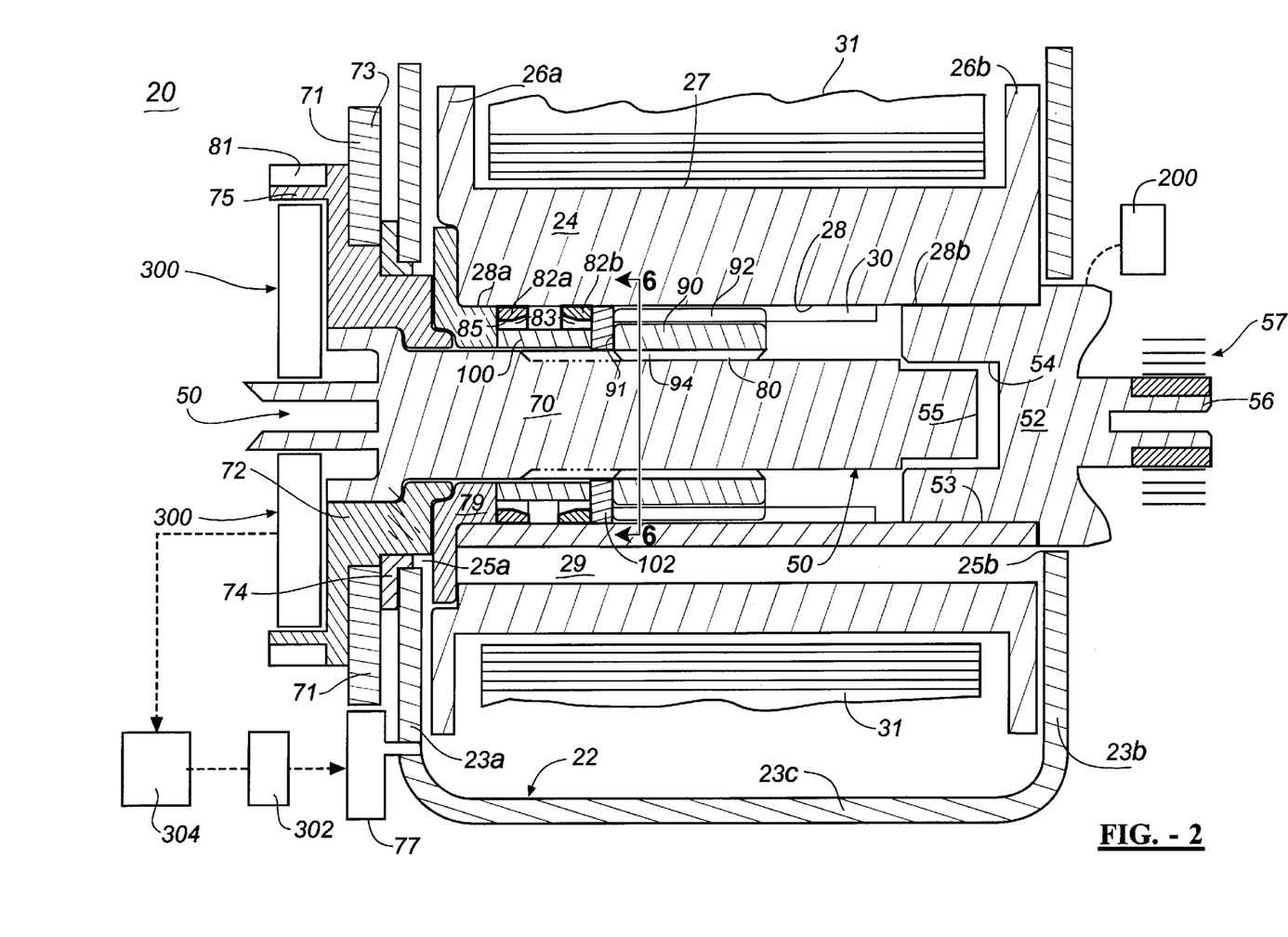
FIG. 2 is a cross-sectional view of an exemplary seat belt retractor in accordance with the invention.

With reference to FIG. 2, a cross-sectional view of an exemplary embodiment of a constant force retractor in accordance with the present invention is shown, designated generally as 20. Retractor 20 is operational to allow a controlled protraction of a seat belt 31 during an automobile accident. As the occupant moves forward against seat belt 31 during an accident, a generally constant reaction force is provided by retractor 20 wherein seat belt 31 is caused to protract at a substantially constant rate up to a predetermined distance. As a result, seat belt related injury to the occupant is diminished.

Retractor 20 includes a spool or reel 24 rotatably mounted to a U-shaped frame 22. Spool 24 includes two flanges 26a and 26b, a center portion 27 about which seat belt webbing 31 is wound and a center bore 28 which includes a plurality of axially directed splines, slots or keyways 30. Center portion 27 includes a slot 29 which provides a means for inserting one end of seat belt 31 into spool 24 in a known manner. U-shaped frame 22 to which the spool 24 is rotatably mounted, is adapted to be connected to a part of a vehicle body or to a part of an occupant seat. Frame 22 includes frame sides 23a,b having respective openings 25a and 25b and a rear or connecting part 23c. The central openings may be of different diameter as shown and may depend upon how the spool is supported on the frame sides.

Partially situated within bore 28 of spool 24, is an axle assembly 50 which includes a first member 52 inserted in bore end 28b, and a second member 70 at bore end 28a. First member 52 includes a walled portion 53 received in bore end 28b and provides a bearing surface to rotatably support spool 24. Spool 24 is decoupled from member 52 whereby the spool can rotate in the seat belt protraction direction independently of member 52. First member 52 also includes a hexagonal bore 54 to provide a driving, rotational engagement with a complementary shaped end 55 of second member 70 of the axle assembly. Hence, rotation of member 52 causes corresponding rotation of member 70. First member 52 includes a forked end 56 that forms a spring arbor and is adapted to receive a rewind spring 57, of known construction to retract the extended seat belt.

Figure 6:
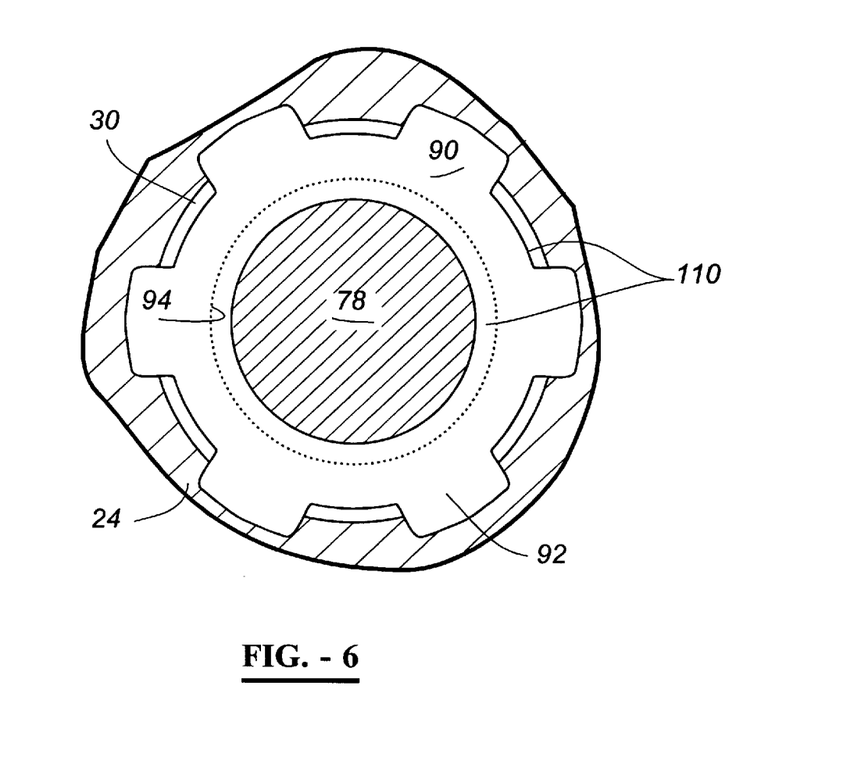
FIG. 6 is a cross-sectional view showing the nut mating with the spool and axle.

A pyrotechnic pretensioner 200 (or belt tightener) mechanism is coupled to first axle member 52. Pretensioner 200 is operable to generate combustion products to drive a piston therein. The piston in turn causes rollers (not shown) to become coupled to first member 52 to rotate, thereby rewinding member 52. As member 52 rewinds, so does member 70 due to the hexagonal engagement at end 55. Member 70 is coupled to the spool by means of a driving member such as a nut 90 having threads 94 matingly engaged to threads 80 on member 70. The nut is coupled to spool 24 via splines 92 on the outer surface of the nut and cooperating splines 30 of the spool. This is shown more clearly in the cross-sectional view of FIG. 6. Splines 30 may be made of one material and the spool of another. For example, splines 30 may be formed on an aluminum insert within a plastic or steel spool. In any case, the mating engagement of the threads 80, 94 is sufficient to cause rotation of spool 24 when member 70 rotates during "non-accident" seat belt operation, e.g., during manual seat belt adjustment. As member 52 rewinds during seat belt retraction, member 70 and spool 24 correspondingly rewind. Alternatively, the fit between member 52 and the spool is a frictional fit whereby rotation of member 52 directly causes the spool to rotate. However, in this case the friction must be low enough to allow the spool to rotate in the opposite (protraction) direction when axle 50 locks relative to the frame, such as during an accident.

Typically, during an accident, an electric control signal is applied to pretensioner 200 by a control module to initiate its operation. The action of the pretensioner which causes spool rotation, reduces excessive slack in belt 31 (or belt system consisting of a torso and/or lap belt) connected to retractor 20. Pretensioners suitable for the above purpose are known in the art, the specific construction of pretensioner 200 is not critical to the present invention.

Second member 70 of the axle assembly includes a portion 72 that is supported relative to frame 22 by an annular bearing 74. An annular member 79 is fitted against member 70 and serves as a mechanical stop. Annular member 79 is received within a groove of the spool and also provides a bearing surface about which the spool rotates. A lock wheel 71 is integrally formed or fastened to axle portion 72 and includes lock teeth 73 engageable by a locking pawl 77. The locking pawl is mounted to frame 22 in a known manner and locks the lock wheel 71 during an accident to thereby prevent axle assembly 50 from rotating in the seat belt protraction direction.

Figure 3:
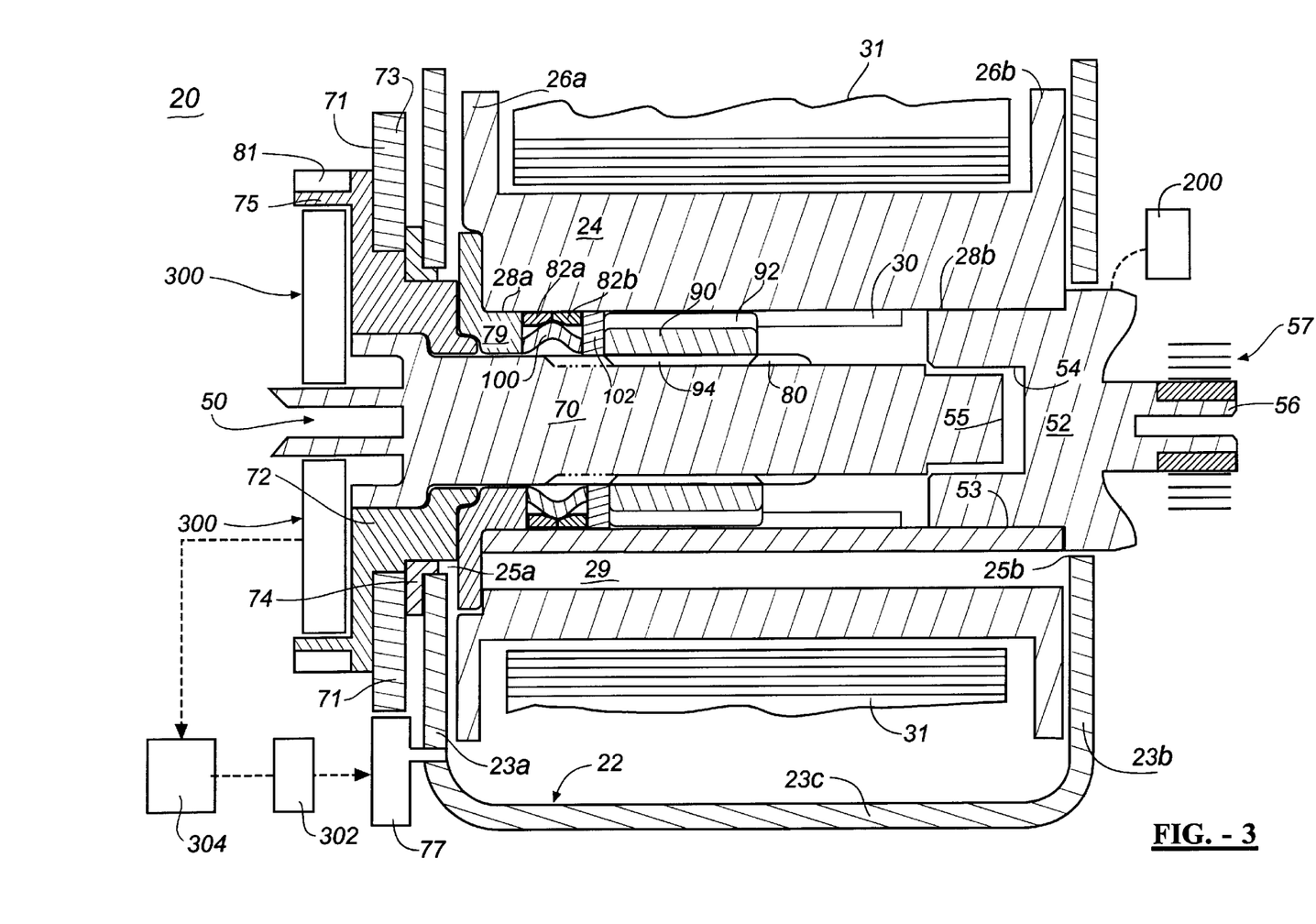
FIG. 3 shows the retractor of FIG. 2 with a deformable bushing deformed during an accident.

An aspect of the present invention resides in the use of an energy absorbing means to absorb energy during a crash in a controlled manner, allowing a controlled protraction of the seat belt up to a predetermined maximum length and thus reducing seat belt injury to the occupant. This energy absorbing means comprises a deformable, energy absorbing bushing 100 situated between stop member 79 and nut 90, a thrust washer 102 between the bushing and the nut, and a pair of stop rings 82a, 82b disposed on opposing ends of bushing 100. There is a clearance fit between washer 102 and spool bore 28 and a slidable engagement of the washer with the outer diameter of second member 70. During an accident, the driving force of nut 90 due to occupant loading, is applied to washer 102 and transferred to bushing 100. Once this force exceeds a predetermined threshold, bushing 100 begins to buckle, thus enabling the nut 90 to turn and the seat belt to be controllably protracted. The deformed bushing 100 contacts stop rings 82a and 82b when it reaches a specifically designed deformation shape, as shown in FIG. 3. Stop ring 82b is caused to move during the deformation by contact with washer 102. Alternatively, stop ring 82b could be designed to abut stop ring 82a in the "non-accident" state. Another option is to use a single stop ring to replace the pair of stop rings 82a, 82b, in this case the two stop rings would be joined by a thin cylindrical center link (not shown).

Figure 4A:
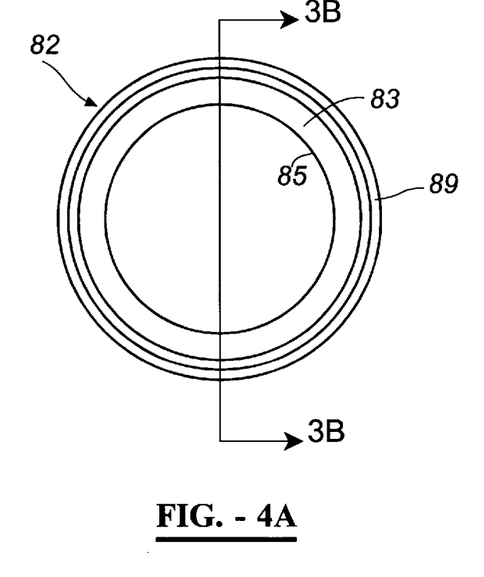
FIGS. 4A and 4B are views of a stop ring used in the retractor.
Figure 4B:
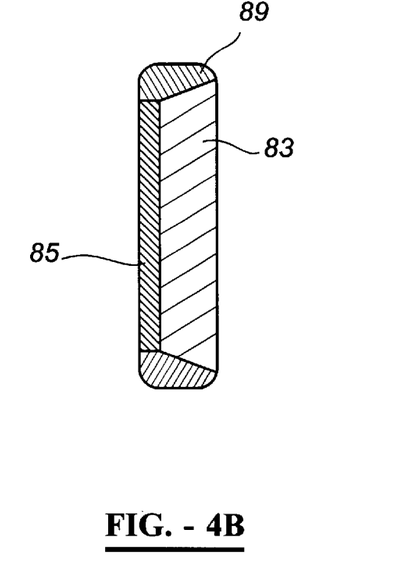

End and side views of stop ring 82 (i.e., stop ring 82a or 82b) are shown in FIGS. 4A and 4B, respectively. The inner diameter is made up of a smaller diameter portion 85 and a tapered diameter portion 83. The outer diameter may include chamfers 89. The tapering of the inner diameter provides for a high surface area contact with the deformed bushing 100. The taper can be designed to maximize the contact surface area, which will of course depend on the deformation characteristics of the bushing. Such contact (between the bushing and the stop rings) will prevent bushing 100 from deforming further or being crushed entirely. Once the stop rings contact the deformed bushing as depicted in FIG. 3, nut 90 will be prevented from turning further since a high reaction force is provided by means of the stop rings. As such, further protraction of the belt will be prevented at this point, thus limiting the travel by the occupant during the accident due to the load limiting retractor. Hence, the occupant is prevented from contacting internal parts of the vehicle.

Thrust washer 102 eliminates or minimizes any torsional loading between the nut and bushing 100 and permits the nut to be free to rotate relative to bushing 100. One reason for eliminating or at least minimizing the torsional loading between the nut and bushing 100 is to better control the mode of deformation of the crushable member or bushing 100. The torsional loading can be substantially eliminated by providing a slick, low friction interface at or a coating to the end face 91 of the nut, or to the entire surface of nut 90.

Such interface or coating may include coating the nut with a fluorocarbon material or chrome plating the nut. Another low friction interface may be achieved by a nitride coating on the nut or fabricating the nut using an oil impregnated, sintered metal.

Preferably, a fluorocarbon coating (coating 110 of FIG. 6) of about 0.01 mm (0.0003 inches) thick is also applied to threads 94 of nut 90 and/or to the mating threads 80 of second member 70, as well as to splines 92 of the nut and/or splines 30 of the spool. The fluorocarbon coating reduces the friction between the spool and nut and between the nut and axle member 70, thus providing generally constant load limiting during the accident. The coating also helps to fill all the voids that occur during the machining process of nut and bolt. Without the coating, such voids and other imperfections of the mating components can create a high frictional interface, resulting in undesirable, uneven load limiting. By decreasing the friction in the system with the fluorocarbon coating, the energy absorption is carried out primarily by bushing 100. The coating thus reduces any uneven energy absorption by friction due to sliding of the parts.

In addition, the surface condition of washer 102 may affect the mode of deformation of bushing 100 and thereby the reaction torque (or force) generated by retractor 20. If the surface is rough, the bushing may buckle and assume a preferred barrel-like shape permitting achievement of a desirable limited reaction force characteristic. Otherwise, if the surface is ground smooth, the reaction force at the interface of the washer and bushing may cause the end of the bushing to flare outwardly, which increases the reaction force generated on the seat belt.

Figure 7:
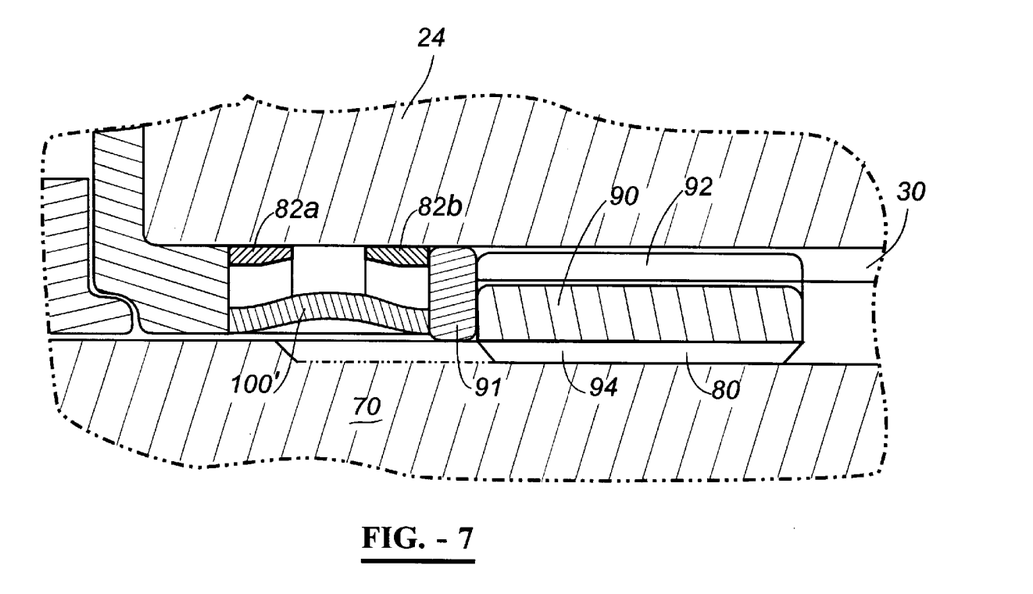
FIG. 7 is a cross-sectional view illustrating an alternative embodiment for the deformable bushing.

To further assure that bushing 100 crushes in a controlled barrel shape, the bushing may be pre-formed (pre-torqued) into the shape of a barrel, as shown in FIG. 7. Barrel 100', is a pre-formed barrel which will deform into a wider diameter barrel and contact stop rings 82a, 82b during an accident.

The retractor additionally includes a web sensor 300 and a vehicle sensor 302. Member 70, through lock wheel 71, is locked in response to information derived from vehicle sensor 302 and web sensor 300. These sensors respectively sense excessive vehicle deceleration and excessive acceleration of seat belt protraction from retractor 20. The web sensor may be disposed within a lock cup 304 which is received adjacent a ratchet wheel 75. Vehicle sensor 302 is carried by lock cup 304 and includes a sensor pawl (not shown) that engages ratchet teeth 81. Movement of the lock cup moves the lock pawl 77, which is mounted to frame 22, into engagement with the lock teeth 73, thus preventing rotation of axle member 70 with respect to the frame. During an accident, lock wheel 71 is stopped by the action of the various sensors and pretensioner 200 is activated to reverse wind spool 24. More specifically, first member 52 is reverse wound under control of pretensioner 200 and a clutch (not shown) coupled to member 52. The rotation of first member 52 is transferred to second member 70 through the interface of the bore 52 and end 55. The rotation of second member 70 is transferred to spool 24 through the threaded and splined interconnection of the second member/nut/spool, thus reverse winding the spool to eliminate slack in the seat belt (shoulder and/or lap belt). With the pawl 77 engaging teeth 73 of lock wheel 71, second member 70 is prevented from rotating in a belt unwinding direction. Subsequently, the occupant will tend to move forward as the accident progresses and load the seat belt 31. The occupant's motion (position and acceleration) is then controlled by the reaction force generated within the retractor. The occupant's load on the shoulder belt is partially transmitted via the remaining seat belt webbing wound about center part 27 of spool 24 creating a torque tending to rotate the spool in a belt unwinding (protraction) direction.

As previously mentioned, the spool rotates about the bearing surfaces provided by first member 52 and member 79. The tendency of the spool to rotate is curtailed by the reaction forces generated at the interfaces between nut 90 and spool 24, the nut and the second member and lock wheel 71 and lock pawl 77. The loads (or torques) imparted to the spool are transmitted directly to threads 80 of the now locked second member 70 which tends to cause nut 90 to try to rotate towards the bushing about threads 80 and simultaneously slide along splines 30. This motion is initially halted by bushing 100 which is loaded between stop member 79 and washer 102. At some level of belt force, the torsional forces developed at thread interface 80/94 will be sufficient to cause bushing 100 to begin to deform. For example, deformation of a leaded steel bushing will begin at approximately 1.5–8.0 kN of force.

Once this force level is reached, nut 90 will continue to rotate and slide along, compressing or deforming the bushing. As the spool rotates, seat belt webbing is permitted to protract in response to the pulling force exerted by the occupant on the seat belt. The pulling force is limited principally by the reaction force capability of shaft assembly 50, that is, compression characteristics of the bushing 100. In this manner, the HIC and chest loading of the occupant is limited. As can be seen from the above and in the preferred embodiment of the invention, control of the occupant's motion is obtained by generating a substantially constant reaction force against the belt. This constant reaction force permits the occupant to be subjected to a controlled, generally constant acceleration.

Figure 5:
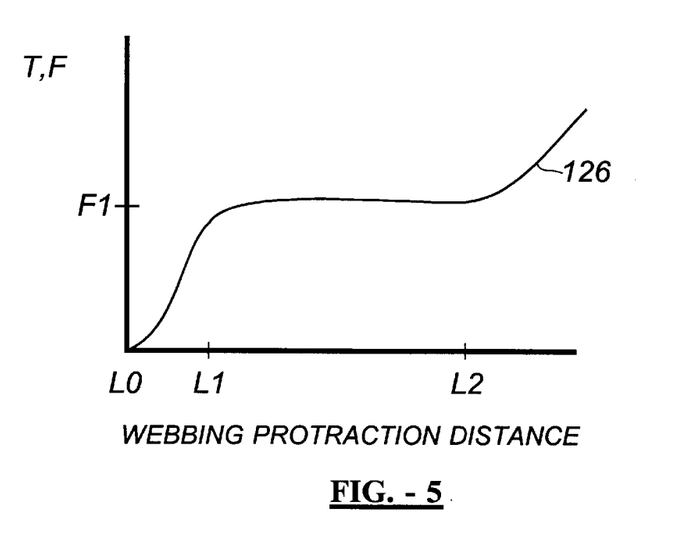
FIG. 5 is a graph of reaction force versus webbing protraction distance.

FIG. 5 is a graph illustrating reaction force (or torque) of retractor 20 on the seat belt as a function of webbing protraction distance during an accident. The horizontal axis represents cumulative seat belt extension measured after a pretensioner, if used, has rewound the seat belt about the spool (by an amount $L_0$) for a first crash. As the bushing 100 is initially compressed, the reaction force is defined generally by the yield strength of the bushing such that the webbing protracts as shown between the distances $L_0$ and $L_1$.

During this phase of operation, the bushing is in an elastic mode of deformation. Further rotation of the spool and movement of the nut compresses the bushing to its yield strength limit (into a plastic region of deformation) and generates through the nut the reaction force or torque on the spool which in turn generates a constant reaction force F1 on the belt. The dimensions of outer bore 28 and the length and material of bushing 100 are chosen to achieve a generally constant reaction force during the primary accident while permitting webbing to protract. This reaction force is approximately in the range of 1.5–8.0 kN (400–2000 lbs.), depending on the crash characteristics. To achieve a tight tolerance of constant reaction force F1 of approximately ±500 NDyn with high occupant loads, a metal (including a leaded steel) bushing with elongation properties above five percent (5%) is preferable. This material will give a substantially constant load limiting at high loads depending on the size of thickness of the bushing and yield strength of material.

For example, during a typical accident, the occupant may cause about 20 cm (8 inches) of webbing to be protracted from the retractor. This amount of protraction can be directly equated to deformation of the bushing, since a predetermined number of nut and spool rotations will have occurred when the final deformation shape is attained. (The amount of protraction is also independent of the amount of retraction caused by the pretensioner 200, since the pretensioner is decoupled from the spool.) The bushing length and the thread pitch of threads 80 and 94 can thus be chosen to permit nut 90 to be able to move the anticipated distance towards the bushing. Once the bushing compresses to the point of contact with stop rings 82a and 82b (corresponding to webbing distance $L_2$), if the occupant loading continues, the reaction forces linearly increase, thus inhibiting further protraction. This linear increase is illustrated by portion 126 of the curve. Further deformation of the bushing is thus controlled by means of the stop rings.

Accordingly, the utility of regulating the maximum pay out with the stop rings is readily apparent. After the bushing 100 has been compressed against the stop rings and the first impact has subsided, the retractor 20 is fully functional and will rewind the protracted webbing onto the spool as soon as the occupant forces have subsided.

It will be understood that the embodiments disclosed herein are merely exemplary and that one skilled in the art can make many variations and modifications to the disclosed embodiments without departing from the spirit and scope of the invention as defined by the appended claims.

We claim:

1. An energy absorbing seat belt retractor, comprising:
   frame;
   a spool rotatably mounted relative to the frame for protracting and retracting a seat belt wound thereabout;
   a driving member operatively coupled to the spool;
   a deformable energy absorbing member disposed within a bore of the spool for receiving a driving force supplied by the driving member responsive to an occupant load, said energy absorbing member deforming when the driving force exceeds a predetermined threshold to thereby absorb energy and permit a controlled rotation of the spool and a corresponding controlled protraction of the belt as the belt is loaded by the occupant; and
   at least one stop ring disposed within the spool and separate therefrom and located in proximity to the deformable member for contacting the deformable member in a deformed state and controlling further deformation thereof to thereby limit the protraction of the seat belt.

2. The seat belt retractor of claim 1 wherein the deformable member comprises a leaded steel bushing which deforms in the shape of a barrel when the driving force exceeds the predetermined threshold.

3. The seat belt retractor of claim 1 wherein the deformable member comprises a metal bushing having a preformed, barrel-like shape, the barrel-like shape deforming to a larger diameter barrel upon application of the driving force beyond the predetermined threshold.

4. The seat belt retractor of claim 1 further comprising a washer interposing the driving member and the deformable member for limiting torsion on the deformable member.

5. The seat belt retractor of claim 1 further comprising an axle disposed within the bore of the spool and having an outer diameter with a threaded portion, and further wherein the driving member comprises a nut having threads matingly engaged with the threaded portion and having a plurality of splines on an outer surface thereof, the spool having a plurality of cooperating splines, wherein when the spool rotates in a seat belt protraction direction with respect to the axle, the nut rotates on the threads and moves axially along the splines towards the deformable member.

6. The seat belt retractor of claim 1 further including:
   an axle having a first portion disposed within the bore of the spool and having a second portion;
   a lock wheel operatively coupled to the axle second portion, including a plurality of lock teeth associated therewith; and
   means coupled to the frame for engaging the lock wheel upon sensing one of a vehicle deceleration and seat belt protraction above respective predefined levels to stop the lock wheel and the axle from rotating relative to the frame in at least a seat belt protraction direction.

7. The seat belt retractor of claim 1 further including:
   an axle received within the bore of the spool; and
   a stop and bushing member interposed between the axle and the spool, wherein the stop and bushing member provides a reaction surface upon which the deformable member is pushed by the driving member.

8. An energy absorbing seat belt retractor, comprising:
   a frame;
   a spool rotatable mounted relative to the frame for protracting and retracting a seat belt wound thereabout;
   a driving member operatively coupled to the spool;
   a deformable energy absorbing member disposed within a bore of the spool for receiving a driving force supplied by the driving member responsive to an occupant load, said energy absorbing member deforming when the driving force exceeds a predetermined threshold to thereby absorb energy and permit a controlled rotation of the spool and a corresponding controlled protraction of the belt as the belt is loaded by the occupant; and
   at least one stop ring disposed in proximity to the deformable member for contacting the deformable member in a deformed state and controlling further deformation thereof to thereby limit the protraction of the seat belt;
   wherein the at least one stop ring has an inner diameter, at least a portion of which is tapered to substantially conform to a buckled deformation shape of the deformable member to control the further deformation.

9. The seat belt retractor of claim 8
   wherein the at least one stop ring comprises a pair of stop rings in proximity to opposing ends of the deformable member, each having an inner diameter of which at least a portion is tapered to substantially conform to a buckled deformation shape of a respective end of the deformable member.

10. The seat belt retractor of claim 8, further including a pretensioner means for initiating rewinding of the spool and the seat belt subsequent to an accident, the pretensioner means being decoupled from the spool such that the controlled protraction of the belt is independent of an amount that the spool was caused to rewind in response to operation of the pretensioner means.

11. The seat belt retractor of claim 10, further including an axle assembly received within the bore of the spool having a first axle member operatively coupled to be rotated by the pretensioner means, and a second axle member driven by the first axle member, the first axle member including a part that forms a portion of a bushing means for rotatably supporting one side of the spool thereon.

12. An energy absorbing seat belt retractor, comprising:
   a frame;
   a spool rotatable mounted relative to the frame for protracting and retracting a seat belt wound thereabout;
   a driving member operatively coupled to the spool;
   a deformable energy absorbing member disposed within a bore of the spool for receiving a driving force supplied by the driving member responsive to an occupant load, said energy absorbing member deforming when the driving force exceeds a predetermined threshold to thereby absorb energy and permit a controlled rotation of the spool and a corresponding controlled protraction of the belt as the belt is loaded by the occupant; and at least one stop ring disposed in proximity to the deformable member for contacting the deformable member in a deformed state and controlling further deformation thereof to thereby limit the protraction of the seat belt;

further comprising an axle disposed within the bore of the spool and having an outer diameter with a threaded portion, and further wherein the driving member comprises a nut having threads matingly engaged with the threaded portion and having a plurality of splines on an outer surface thereof, the spool having a plurality of cooperating splines, wherein when the spool rotates in a seat belt protraction direction with respect to the axle, the nut rotates on the threads and moves axially along the splines towards the deformable member;

further including a fluorocarbon coating between the threaded portion of the axle and the threads of the nut, and between the associated splines of the spool and the nut, to reduce friction between the nut and the axle and between the nut and the spool, thereby providing additional control of seat belt protraction.

13. An energy absorbing seat belt retractor, comprising:

a frame;

a spool rotatably mounted relative to the frame for protracting and retracting a seat belt wound thereabout;

a deformable energy absorbing member disposed within a bore of the spool;

an axle disposed at least partially within the bore of the spool and having an outer diameter with a threaded portion;

a rotatable and slidable nut interposing the axle and the spool having threads matingly engaged with the axle threaded portion and having a plurality of splines on an outer surface thereof, the spool having a plurality of cooperating splines;

wherein during an accident, the axle locks with respect to the frame, and occupant loading of the spool above a predetermined threshold causes spool rotation with respect to the axle by means of the nut rotating on the threads and moving axially along the splines towards the deformable member to deform the deformable member, thereby permitting a controlled rotation of the spool and a corresponding controlled protraction of the belt as the belt is loaded by the occupant; and the retractor further including a fluorocarbon coating between the threaded portion of the axle and the threads of the nut, and between the associated splines of the spool and of the nut, to reduce friction between the nut and the axle and between the nut and the spool, thereby providing additional control of seat belt protraction.

14. The retractor of claim 13 wherein the fluorocarbon coating is provided on the threads of the nut and on the splines of the nut.

15. The retractor of claim 13 wherein the fluorocarbon coating is about 0.0003 inches thick.

16. The retractor according to claim 13 further including stop means in proximity to the deformable member for controlling deformation of the deformable member and limiting seat belt protraction.

17. A safety system comprising:

an energy absorbing seat belt retractor and a pretensioner means for initiating rewinding a retractor spool and a seat belt wound thereon subsequent to an accident;

the retractor including bushing means for rotationally mounting the spool so that it rotates relative to a frame, and an energy absorbing means including a deformable energy absorbing member for permitting the controlled rotation of the spool and a corresponding controlled protraction of the belt as the belt is loaded by an occupant, such controlled protraction of the belt being independent of the amount that the spool is was caused to rewind in response to operation of the pretensioner means; and the retractor further including stop means located within the spool and separate therefrom for limiting length of protraction of the belt during the accident by contacting the deformable member in a deformed state to prevent excessive and uncontrolled deformation thereof.

18. The safety system according to claim 17 wherein the energy absorbing means includes an axle assembly received within a bore of the spool having a first axle member and a second axle member driven by the first axle member, the first axle member including a first part operatively coupled to be rotated by operation of the pretensioner means and a second part comprising part of the bushing means for rotationally supporting one side of the spool thereon.

19. A safety system comprising:

an energy absorbing seat belt retractor and a pretensioner means for initiating rewinding a retractor spool and a seat belt wound thereon subsequent to an accident;

the retractor including bushing means for rotationally mounting the spool so that it rotates relative to a frame, and an energy absorbing means including a deformable energy absorbing member for permitting the controlled rotation of the spool and a corresponding controlled protraction of the belt as the belt is loaded by an occupant, such controlled protraction of the belt being independent of the amount that the spool is was caused to rewind in response to operation of the pretensioner means; and the retractor further including stop means for limiting length of protraction of the belt during the accident by contacting the deformable member in a deformed state to prevent excessive and uncontrolled deformation thereof; wherein the energy absorbing means includes an axle assembly received within a bore of the spool having a first axle member and a second axle member driven by the first axle member, the first axle member including a first part operatively coupled to be rotated by operation of the pretensioner means and a second part comprising part of the bushing means for rotationally supporting one side of the spool thereon;

wherein:

the energy absorbing means further includes a sliding and rotating nut supported between the second axle member and the spool, the nut sliding in response to relative rotation between the second axle member and the spool, the deformable member being mounted about the second member and deformed in contact with the nut to generate a reaction force which is transferred through the nut to the spool to control the rotating of the spool and the protraction of the seat belt wound thereabout; and, the stop means comprising at least one stop ring in proximity to the deformable member having an inner diameter at least a portion of which is tapered to substantially conform to a deformed shape of the deformable member.

20. The safety system of claim 19 wherein the at least one stop ring comprises a pair of stop rings disposed in proximity to opposing ends of the deformable member, each having a tapered inner diameter conforming to a deformed portion of the deformable member in the deformed state.

21. An energy absorbing seat belt retractor, comprising:

a frame (22);

a spool (24) rotatably mounted relative to the frame for protracting and retracting a seat belt (31) wound thereabout;

a driving member (90) operatively coupled to the spool;

a deformable member (100) disposed within a bore (28) of the spool for receiving a driving force supplied by the driving member responsive to an occupant load, and deforming when the driving force exceeds a predetermined threshold, to thereby absorb energy and permit a controlled rotation of the spool and a corresponding controlled protraction of the belt as the belt is loaded by the occupant; and stop ring means (82a, 82b) disposed within the spool and separate therefrom in proximity to the deformable member for contacting the deformable member in a deformed state and controlling further deformation thereof to thereby limit the protraction of the seat belt.

22. The seat belt retractor of claim 21 wherein the stop ring means comprises a pair of stop rings (83a, 83b) in proximity to opposing ends of the deformable member, each having an inner diameter (83, 85) of which at least a portion (83) is tapered to substantially conform to a buckled deformation shape of a respective end of the deformable member.

23. The seat belt retractor of claim 21 further comprising a washer (102) interposing the driving member and the deformable member for limiting torsion on the deformable member.

24. The seat belt retractor of claim 21 further comprising an axle (70) disposed within the bore of the spool and having an outer diameter with a threaded portion (80), and further wherein the driving member comprises a nut (90) having threads matingly engaged with the threaded portion and having a plurality of splines (94) on an outer surface thereof, the spool having a plurality of cooperating splines (30), such that when the spool rotates in a seat belt protraction direction with respect to the axle, the nut rotates on the threads and moves axially along the splines towards the deformable member.

25. The seat belt retractor of claim 21, further including a pretensioner means (200) for initiating rewinding of the spool and the seat belt subsequent to an accident, the pretensioner means being decoupled from the spool such that the controlled protraction of the belt is independent of an amount that the spool was caused to rewind in response to operation of the pretensioner means.

26. The seat belt retractor of claim 25, further including an axle assembly (50) received within the bore of the spool having a first axle member (52) operatively coupled to be rotated by the pretensioner means, and a second axle member (70) driven by the first axle member, the first axle member including a part (53) that forms a portion of a bushing means for rotatably supporting one side of the spool thereon.

27. The seat belt retractor of claim 21 further including:

an axle (70) having a first portion disposed within the bore of the spool and having a second portion;

a lock wheel (71) operatively coupled to the axle second portion, including a plurality of lock teeth (73) associated therewith; and means (77, 302, 300, 304) coupled to the frame for engaging the lock wheel upon sensing one of a vehicle deceleration and seat belt protraction above respective predefined levels to stop the lock wheel and the axle from rotating relative to the frame in at least a seat belt protraction direction.

28. An energy absorbing seat belt retractor, comprising:

a frame (22);

a spool (24) rotatably mounted relative to the frame for protracting and retracting a seat belt (31) wound thereabout;

a driving member (90) operatively coupled to the spool;

a deformable member (100) disposed within a bore (28) of the spool for receiving a driving force supplied by the driving member responsive to an occupant load, and deforming when the driving force exceeds a predetermined threshold, to thereby absorb energy and permit a controlled rotation of the spool and a corresponding controlled protraction of the belt as the belt is loaded by the occupant; and stop ring means (82a, 82b) disposed in proximity to the deformable member for contacting the deformable member in a deformed state and controlling further deformation thereof to thereby limit the protraction of the seat belt;

wherein the stop ring means comprises at least one stop ring (82a, 82b) having an inner diameter (83, 85) at least a portion (83) of which is tapered to substantially conform to a buckled deformation shape of the deformable member to prevent the excessive deformation thereof.

29. An energy absorbing seat belt retractor, comprising:

a frame (22);

a spool (24) rotatably mounted relative to the frame for protracting and retracting a seat belt (31) wound thereabout;

a driving member (90) operatively coupled to the spool;

a deformable member (100) disposed within a bore (28) of the spool for receiving a driving force supplied by the driving member responsive to an occupant load, and deforming when the driving force exceeds a predetermined threshold, to thereby absorb energy and permit a controlled rotation of the spool and a corresponding controlled protraction of the belt as the belt is loaded by the occupant; and stop ring means (82a, 82b) disposed in proximity to the deformable member for contacting the deformable member in a deformed state and controlling further deformation thereof to thereby limit the protraction of the seat belt;

further comprising an axle (70) disposed within the bore of the spool and having an outer diameter with a threaded portion (80), and further wherein the driving member comprises a nut (90) having threads matingly engaged with the threaded portion and having a plurality of splines (94) on an outer surface thereof, the spool having a plurality of cooperating splines (30), such that when the spool rotates in a seat belt protraction direction with respect to the axle, the nut rotates on the threads and moves axially along the splines towards the deformable member;

further including a fluorocarbon coating (110) between the threaded portion of the axle and the threads of the nut, and between the associated splines of the spool and the nut, to reduce friction between the nut and the axle and between the nut and the spool, thereby providing additional control of seat belt protraction.

* * * * *